US007280116B2

(12) United States Patent
Shepherd et al.

(10) Patent No.: US 7,280,116 B2

(45) Date of Patent: Oct. 9, 2007

(54) PIXEL DATA PREPROCESSING METHODS AND SYSTEMS

(75) Inventors: Thomas J. Shepherd, McKinney, TX (US); Donald Richard Tillery, Jr., Murphy, TX (US); Moslema Sharif, Plano, TX (US); Alok Mishra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 299 days.

(21) Appl. No.: 11/082,328

(22) Filed: Mar. 17, 2005

(65) Prior Publication Data

US 2006/0209081 A1 Sep. 21, 2006

(51) Int. Cl.
*G06T 15/00* (2006.01)

(52) U.S. Cl. ....................... 345/589; 345/557; 358/1.9; 358/509; 358/512

(58) Field of Classification Search ................ 345/589, 345/531, 557, 602; 358/1.9, 509, 512, 514
See application file for complete search history.

(56) References Cited

U.S. PATENT DOCUMENTS

| | | | | |
|---|---|---|---|---|
| 6,693,643 | B1 * | 2/2004 | Trivedi et al. | 345/602 |
| 6,812,928 | B2 * | 11/2004 | Emberling et al. | 345/531 |
| 6,961,149 | B2 * | 11/2005 | Komiya et al. | 358/1.9 |
| 7,015,921 | B1 * | 3/2006 | Trivedi et al. | 345/557 |

* cited by examiner

*Primary Examiner*—Phu K. Nguyen
(74) *Attorney, Agent, or Firm*—Ronald O. Neerings; Wade James Brady, III; Frederick J. Telecky, Jr.

(57) ABSTRACT

Methods and systems are disclosed for preprocessing video display pixel data. A preprocessor is provided with a selectable gamma correction mode and a selectable palette lookup mode. In palette lookup mode, a LUT memory area is used for performing a palette lookup for each of the red, green, and blue components of video pixel data, concatenating the paletted red, green, and blue components, and outputting paletted preprocessed pixel data. In gamma correction mode, the preprocessor uses the same LUT memory area for performing gamma correction on each of the red, green, and blue components of video pixel data, concatenating the gamma-corrected red, green, and blue components, and outputting a gamma-corrected preprocessed pixel data.

7 Claims, 2 Drawing Sheets

PIXEL DATA PREPROCESSING METHODS AND SYSTEMS

TECHNICAL FIELD

The invention relates to integrated circuitry and signal processing. More particularly, the invention relates to methods for preprocessing of video pixel data and systems for implementing the same.

BACKGROUND OF THE INVENTION

The RGB (red, green, blue) color model provides a commonly used specification of a three-dimensional color coordinate system. The function of the model is to permit convenient specification of all visible colors on a given display in terms of their red, green, and blue components. The RGB model is additive; Combination of the red, green, and blue components in the right amounts yields white, black, or any color in between. Thus, three RGB components of equal bandwidth are required for the display of any given color. A frame buffer having the same pixel depth and display resolution for each RGB component is used. The three RGB values are read from the buffer for further processing and display. Display devices differ however in their response to RGB data inputs.

In general, RGB video display devices such as, for example CRTs and LCD panels, have a non-linear response to input data. The transfer function of common display devices has an intensity proportional to a given exponent, usually referred to as "gamma." A typical gamma for a CRT display, for example, is about 2.5, which produces white expansion and black compression. As a result, video pixel data typically requires gamma correction as part of preprocessing prior to being input to a display device. Thus to display a given pixel containing components of red, green, and blue (RGB), gamma-corrected R*G*B* values are input into the display device, where * denotes gamma. It is known in the arts to use a gamma lookup table (LUT) to make the gamma corrections, usually the gamma LUT is an area of memory located outside of the display controller.

In order to reduce the total size of the video frame buffer, it has long been known in the arts to use palette memory look-up table (LUTs). One to eight bits per pixel is stored in video memory, which is then used as an address pointer to the palette LUT memory to obtain a new, higher resolution, i.e., greater than eight bits, pixel for display. This practice has become well established in the video processing arts. Display controller integrated circuitry typically includes an allocation of palette LUT memory. In applications where the pixel depth is greater than eight bits to begin with, the palette LUT memory set aside in the IC is not used. In such cases, the pixel display data may proceed directly to gamma-correction, using a different physical memory location.

Consider together the need for both palette lookup and gamma correction in the display of video pixel data, there is always a need for gamma correction, sometimes a need for palette lookup, and sometimes but not always a need for both. The potential variation in preprocessing requirements for individual displays and available video pixel data depth in different applications creates some problems for designers. Of course, conserving chip area is always a major design consideration. Generally, physical space in the circuitry is set aside for pallet lookup memory, and additional physical space is set aside for gamma-correction lookup memory. These separate memory areas may be on separate chips, or on the same IC. In many instances, the on-chip palette lookup table memory area remains unused, while an off-chip gamma correction LUT is used, resulting in an inefficient increase in total chip area. Due to these and other problems, methods and systems for efficient, area-saving, preprocessing of video pixel data would be useful and advantageous in the arts.

SUMMARY OF THE INVENTION

In carrying out the principles of the present invention, in accordance with preferred embodiments thereof, systems and methods for preprocessing video pixel data are described in which chip memory is efficiently used.

According to an aspect of the invention, a preferred method for preprocessing video display pixel data includes steps for providing a preprocessor with both a selectable gamma correction mode and a selectable palette lookup mode. Pixel data of more than eight bits is processed in the gamma correction mode, including steps for gamma-correcting each of the red, green, and blue components, concatenating the gamma-corrected red, green, and blue components, and outputting gamma-corrected preprocessed pixel data. Pixel data of eight bits or less is processed using the palette lookup mode, including steps for performing a palette lookup for each of the red, green, and blue components and concatenating the paletted red, green, and blue components for output of paletted preprocessed pixel data.

According to another aspect of the invention, the preprocessor mode is pre-selected according to the anticipated video pixel data depth.

According to another aspect of the invention, the preprocessor mode is dynamically selected responsive to actual video pixel data depth.

According to yet another aspect of the invention, a step is included for displaying a gamma-corrected preprocessed pixel.

According to another aspect of the invention, a step is included for outputting a paletted preprocessed pixel for gamma-correction.

According to yet another aspect of the invention, a preferred embodiment of a system of the invention is disclosed in which a preprocessor with a frame buffer is provided for receiving video pixel data words. Memory elements are configured in a triple parallel arrangement for separately receiving red, green, and blue video pixel data components from the words. A mode controller provides for selection of either a gamma correction mode whereby each respective red, green, and blue pixel data component is indexed to a memory element corresponding to a gamma lookup table entry, or a palette lookup mode whereby each respective red, green, and blue pixel data component is a pointer to a memory element corresponding to a palette lookup table entry. Means for concatenating the pixel data components is provided for outputting preprocessed video pixel display data.

The invention has advantages including but not limited to the efficient use of chip area and memory resources, and reduced costs. These and other features, advantages, and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as first, second, top, bottom, upper, side, etc., refer to the drawings themselves as laid out on the paper and not to physical limitations of the invention unless specifically noted. The drawings are not to scale, and some features of embodiments shown and discussed are simplified or amplified for illustrating the principles, features, and advantages of the invention.

DETAILED DESCRIPTION OF PREFERRED EMBODIMENTS

In the general practice of the video processing and displaying arts, palette lookup tables are often used in the preparation of video pixel data for display. Ordinarily, palette lookup memory set aside in the preprocessor circuitry is not used when pixel color depth is greater than eight bits. Using this memory for a gamma-correction lookup table in accordance with the invention efficiently utilizes chip area that would otherwise remain unused.

Figure 1:
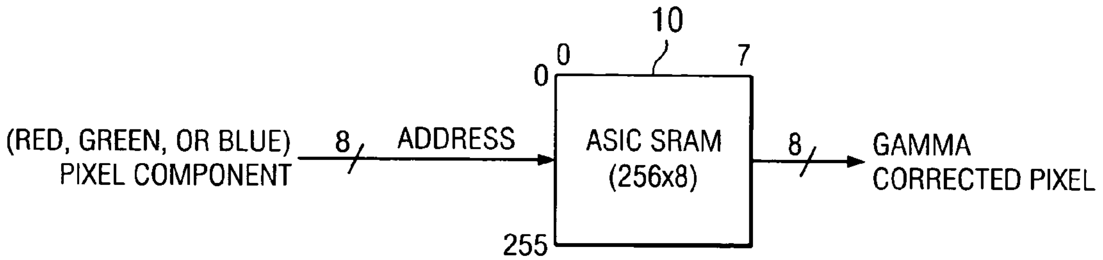
FIG. 1 is a simplified block diagram illustrating an example of a memory portion of a preferred embodiment of the invention.
Figure 2:
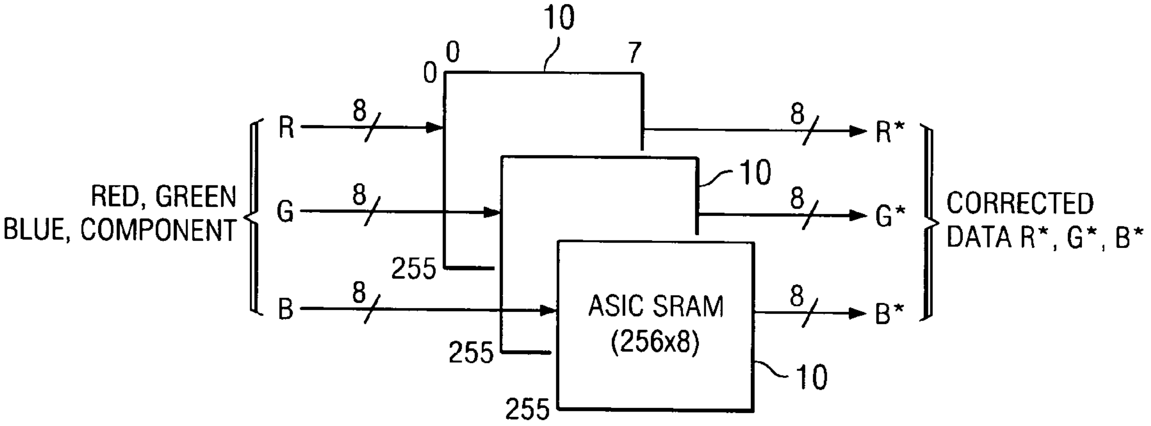
FIG. 2 is a simplified block diagram illustrating an example of memory elements of a preferred embodiment of the invention.

FIG. 1 depicts an example of the use of chip memory 10 ordinarily reserved for a palette lookup table, as a lookup table for gamma correction according to the invention. In this example, the incoming red, green, or blue (R, G, or B), pixel data component is eight bits wide. The individual pixel component, R, G, or B, is the input address to the gamma correction LUT memory location 10, ASIC RAM in this example. The output of the memory location 10 is a gamma-corrected red, green, or blue eight bit pixel component (R*, G*, or B*), which may then be combined with associated pixel components to form a pixel display value. Referring now primarily to FIG. 2, the outputs R*, G*, B*, of three memory locations 10 are shown concatenated to form gamma-corrected 24-bit pixel data suitable for display. Although the example shows eight bit pixel components and a 24-bit output for the purpose of illustrating the invention, those skilled in the arts will recognize that the invention may be practiced with various bit-length data values, and that 1, 2, 4, 8, 12, 16, and 24-bit data values are commonly used.

Figure 3:
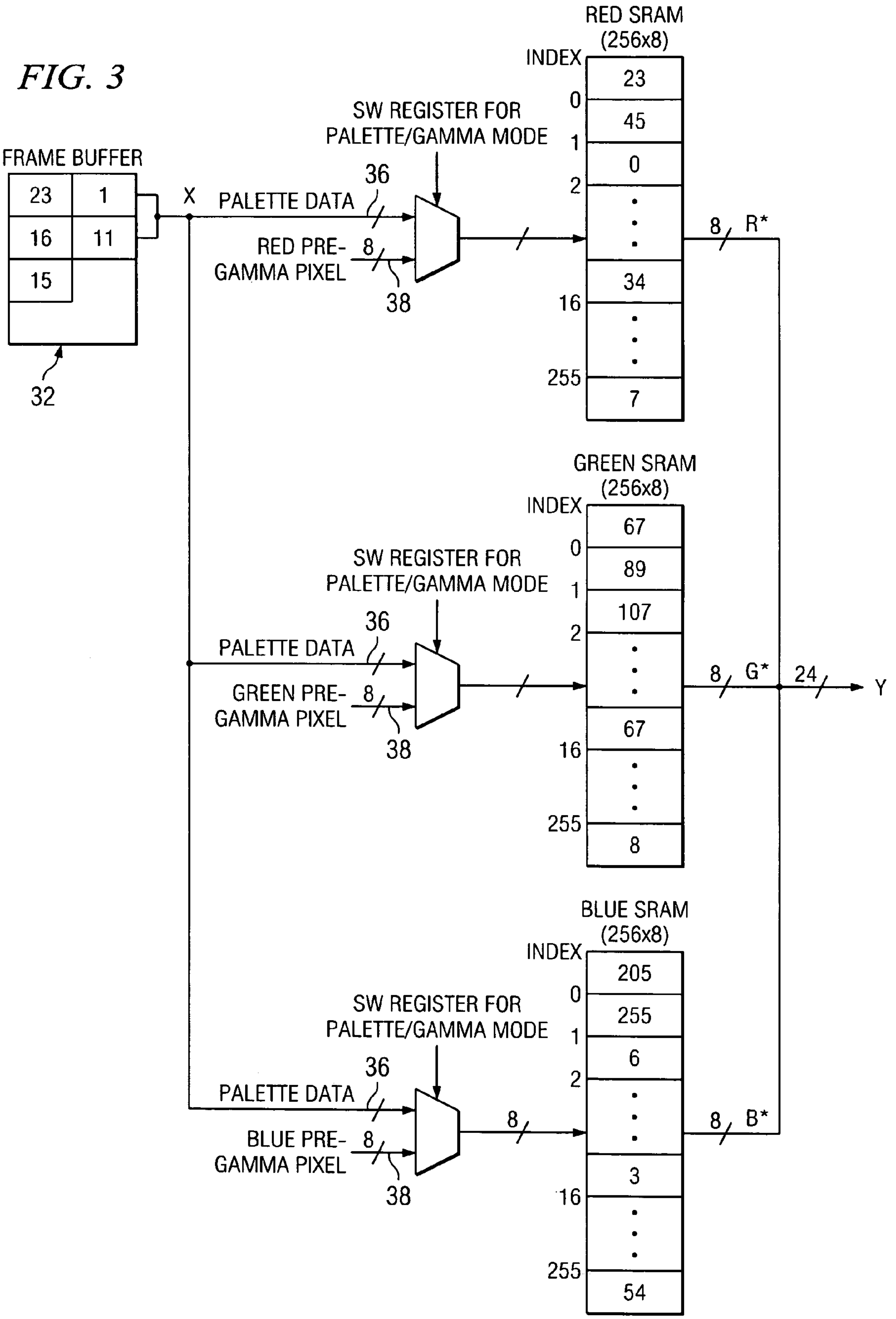
FIG. 3 is a simplified block diagram illustrating an example of preferred methods and systems of the invention.

A further example of a preferred embodiment of the invention and its operation is described with reference primarily to FIG. 3. The preprocessor 30 has a frame buffer 32 for receiving video pixel data input X, consisting of red, green, and blue (RGB) components, from a video signal source, not shown. A controller 34, in this example represented as a register bit, is used to select either palette mode or gamma correction mode, represented by arrow paths 36 and 38 respectively. In the event palette mode 36 is selected, the appropriate RGB values are each retrieved from a palette lookup table memory location 10 and the RGB components are combined and a preprocessed pixel value Y is output for further processing, such as gamma correction, and display. In the event that palette lookup 36 is not used and gamma correction mode 38 is selected, the input X pixel components RGB, are indexed into the three SRAM memory locations 10 and gamma-corrected values R*, G*, B* are retrieved. The gamma-corrected values are then concatenated to produce a pixel data output Y.

It should be understood that in either palette lookup mode 36 or gamma correction mode 38 the output from each of the indicated SRAM locations 10 is concatenated to provide a complete pixel value Y. In either case, the physical SRAM location is utilized. Many variations in preprocessor implementation, video data depth, and display types are possible within the scope of the invention.

The methods and systems of the invention provide advantages including but not limited to efficiency in the usage of chip area and increased design flexibility. While the invention has been described with reference to certain illustrative embodiments, the methods and systems described are not intended to be construed in a limiting sense. Various modifications and combinations of the illustrative embodiments as well as other advantages and embodiments of the invention will be apparent to persons skilled in the arts upon reference to the drawings, description, and claims.

We claim:

1. A method for preprocessing video display pixel data comprising the steps of:

providing a preprocessor having a selectable gamma correction mode and a selectable palette look-up mode;

receiving a pixel data word; and for a pixel data word consisting of more than 8 bits, selecting preprocessor gamma correction mode, whereby the preprocessor performs the further steps of;

parsing the pixel data word into red, green, and blue components;

performing gamma correction on each of the red, green, and blue components;

concatenating the gamma-corrected red, green, and blue components; and outputting a gamma-corrected preprocessed pixel data word;

for a pixel data word consisting of 8 bits or less, selecting preprocessor palette look-up mode, whereby the preprocessor performs the further steps of;

parsing the pixel data word into red, green, and blue components;

performing a palette look-up for each of the red, green, and blue components;

concatenating the paletted red, green, and blue components; and outputting a paletted preprocessed pixel data word.

2. A method for preprocessing video display pixel data according to claim 1 wherein the preprocessor mode is pre-selected according to an anticipated video pixel data word length.

3. A method for preprocessing video display pixel data according to claim 1 wherein the preprocessor mode is dynamically selected responsive to actual video pixel data word length.

4. A method for preprocessing video display pixel data according to claim 1 further comprising the step of displaying the gamma-corrected preprocessed pixel data word output.

5. A system for preprocessing video display pixel data comprising:

a preprocessor having a frame buffer for receiving video pixel data words;

memory elements configured in a triple parallel arrangement for separately receiving red, green, and blue video pixel data components from the word;

a mode controller for selecting between two modes for the memory elements;

a gamma correction mode whereby each respective red, green, and blue pixel data component is indexed to a memory element corresponding to a gamma lookup table entry; and a pallette lookup mode whereby each respective red, green, and blue pixel data component is a pointer to a memory element corresponding to a palette lookup table entry;

concatenating means for combining the pixel data from either the gamma correction lookup table, or the palette lookup table, for outputting preprocessed video pixel display data.

6. A system for preprocessing video display pixel data according to claim 5 wherein the mode controller further comprises means for an operator to preselect the mode according to anticipated video pixel data word length.

7. A system for preprocessing video display pixel data according to claim 5 wherein the mode controller further comprises means for dynamically selecting the mode responsive to actual video pixel data word length.

* * * * *